(12) United States Patent
Tull

(10) Patent No.: US 7,743,722 B2
(45) Date of Patent: Jun. 29, 2010

(54) UNDERWATER VEHICLES

(75) Inventor: Michael Alan Tull, Fareham (GB)

(73) Assignee: BAE Systems plc, London (GB)

( * ) Notice: Subject to any disclaimer, the term of this patent is extended or adjusted under 35 U.S.C. 154(b) by 97 days.

(21) Appl. No.: 11/886,219

(22) PCT Filed: Mar. 14, 2006

(86) PCT No.: PCT/GB2006/000902

§ 371 (c)(1),
(2), (4) Date: Sep. 13, 2007

(87) PCT Pub. No.: WO2006/097709

PCT Pub. Date: Sep. 21, 2006

(65) Prior Publication Data

US 2008/0134952 A1 Jun. 12, 2008

(30) Foreign Application Priority Data

Mar. 16, 2005 (GB) .................................. 0505285.7

(51) Int. Cl.
B63G 8/00 (2006.01)
(52) U.S. Cl. ...................................... 114/321; 385/135
(58) Field of Classification Search .................. 114/244, 114/245, 249, 251, 253, 254, 312, 321; 244/3.12; 385/135, 147
See application file for complete search history.

(56) References Cited

U.S. PATENT DOCUMENTS

| 4,632,507 | A | * | 12/1986 | Mignien et al. | ............ | 385/135 |
| 4,991,793 | A | * | 2/1991 | Belsley et al. | ............... | 242/128 |
| 5,058,969 | A | * | 10/1991 | Peterson et al. | ............ | 244/3.12 |
| 5,109,470 | A | * | 4/1992 | Tooze | ........................ | 244/3.12 |
| 5,349,916 | A | * | 9/1994 | Hillenbrand et al. | ......... | 114/312 |
| 5,396,859 | A | * | 3/1995 | Hillenbrand et al. | ......... | 114/312 |
| 5,398,636 | A | | 3/1995 | Hillenbrand | | |
| 5,520,346 | A | * | 5/1996 | Hoban | ........................ | 244/3.12 |
| 6,113,027 | A | | 9/2000 | Redford | | |
| 7,072,558 | B2 | * | 7/2006 | Tull | ........................... | 385/135 |
| 2005/0084220 | A1 | | 4/2005 | Tull | | |

FOREIGN PATENT DOCUMENTS

WO WO 03/057560 A2 7/2003

* cited by examiner

Primary Examiner—Lars A Olson
(74) Attorney, Agent, or Firm—Jacobson Holman PLLC

(57) ABSTRACT

An underwater vehicle including a housing, an internal guidewire dispenser for storing and deploying a guidewire, and a splice cavity defining a storage space, for carrying and deploying a splice between the internal guidewire and an external guidewire and excess guidewire resulting from splicing the internal and external guidewires.

14 Claims, 2 Drawing Sheets

UNDERWATER VEHICLES

This is a national stage of PCT/GB06/000902 filed Mar. 14, 2006 and published in English.

BACKGROUND OF THE INVENTION

1. Field of the Invention

The present invention relates to improvements in or relating to underwater vehicles.

2. Description of the Related Art

It is known to use a wire command link to connect an underwater vehicle to its launch platform to provide an exchange of information between the underwater vehicle and the launch platform. The wire command link comprises a copper guidewire which is payed-out from the underwater vehicle as it moves through the water.

The command link comprises two interconnected spools of guidewire, one of which is mounted on the underwater vehicle and the other of which is mounted on the launch platform. The spool of guidewire on the launch platform may pay-out through a weighted metal hosepipe which falls, due to gravity, to a position below the launch platform to prevent entanglement of the guidewire with the structure and/or propulsion system of the launch platform. The spool of guidewire on the underwater vehicle unwinds and pays-out from the rear of the underwater vehicle.

Prior to launch of the underwater vehicle using a command link within a hosepipe, the hosepipe is neatly coiled within a launch tube in the launch platform and is connected by a weak link to the rear of the underwater vehicle which is also located within the launch tube. During the launch phase, the underwater vehicle pulls the hosepipe out of the launch tube until fully deployed, when the weak link separates and the hosepipe falls to a position below the launch platform. The guidewire then pays-out from both spools as the underwater vehicle and the launch platform operate and/or manoeuvre independently.

In other underwater vehicle configurations where a command link within a hosepipe is not used the guidewire may pay out directly the launch sequence of the underwater vehicle is commenced.

Whilst copper guidewire is very robust and can be easily jointed and insulated using conventional techniques, there is a move to replace copper guidewire with optical fibres or microcables. Such optical fibres and microcables are, however, quite fragile, and have bend radius limitations. Such optical fibres and cables require a specialised jointing process such as fusion splice techniques.

In fusion splice techniques, lengths of optical fibres or microcables between 0.5 and 1 m are required on each optical fibre or microcable to be available so that the fusion splice technique can be carried out effectively and efficiently. This means that, after the joint has been made, up to 2 m of optical fibre or microcable remains outside the coils of fibre or cable stored in the spools of guidewire in the underwater vehicle and the launch platform where it is vulnerable to damage due to its fragility.

International patent application number PCT/GB02/05789 discloses a means for providing storage, in the form of a splice chamber, between the launch platform and the underwater vehicle for the fusion splice joint and any excess fibre or cable of a command wire having a hosepipe. The splice cavity also provides protection for the fusion splice joint during the launch phase. The splice chamber is mounted between the outboard end of the hosepipe connected to the launch platform and to an underwater vehicle. During the launch sequence the splice chamber containing the splice and the excess optical fibre or microcable is released from the underwater vehicle and splits in two, falling clear of the underwater vehicle, allowing the optical fibre or microcable guidewire to pay out from both the spool in the launch platform and the spool in the underwater vehicle.

However, it is not always desirable to release an object from the underwater vehicle, during the launch sequence due to the potential for fouling on the underwater vehicle, the launch platform or any other object.

SUMMARY OF THE INVENTION

Thus it is an object of the present invention to provide means for providing storage, for the fusion splice joint and any excess fibre or cable that also allows the excess fibre or cable to be deployed in a controlled manner during launch of the underwater vehicle, without the need for an object to be released from the underwater vehicle.

In accordance with a first aspect of the present invention, there is provided an underwater vehicle comprising, a housing, an internal guidewire dispenser for storing and deploying a guidewire, and a splice cavity defining a storage space, for storing and deploying a splice between the internal guidewire and an external guidewire and excess guidewire resulting from splicing the internal and external guidewires.

By including the splice cavity within the underwater vehicle that is capable of storing and deploying a splice between the internal guidewire and an external guidewire and excess guidewire there is no need for an object to be released from the underwater vehicle.

The present invention is suitable for use with wire command links whether or not they utilise a weighted metal hosepipe Advantageously, the splice cavity may be mounted on the internal dispenser or elsewhere in the housing. This allows other design criteria such as weight distribution within the vehicle to be considered when deciding on the position of the splice cavity.

The storage space may be shaped to control the bend radius of the excess guidewire and the splice stored therein. Moreover, the splice cavity can be configured to provide protection for the splice and the excess guidewire during storage.

Preferably the excess guidewire from the internal dispenser is coiled around the internal periphery of the storage space. It is additional preferable that the fusion splice and the excess guidewire from the external dispenser are coiled inside the coils of the excess guidewire from the internal dispenser.

Such an arrangement during storage of the splice and the excess guidewire allows the splice and the excess guidewire to be deployed in a controlled manner. The splice and the excess guidewire are stored in a "last in first out" formation. That is, the last length of excess guidewire inserted into the storage space is from the external dispenser and this becomes the first length of guidewire to be deployed during the launch process. All the excess guidewire and splice in the storage chamber will be deployed before payout continues from the internal or external dispensers.

The guidewires may comprise optical fibres, microcables or copper wire.

In accordance with a second aspect of the present invention, there is provided a method of assembling an underwater vehicle having a housing and a wire command link to connect the vehicle to a launch platform, the link comprising an internal guidewire stored in an internal dispenser and an external guidewire stored in an external dispenser, including the steps of:

a) mounting a splice cavity having a storage space in the housing,
b) dispensing sufficient external guidewire from the external dispenser to carry out a fusion splice and passing the sufficient external guidewire through the splice cavity and the internal dispenser,
c) dispensing sufficient internal guidewire from the internal dispenser to carry out a fusion splice and passing the sufficient internal guidewire through the splice cavity,
d) fusion splicing the sufficient external guidewire and the sufficient internal guidewire,
e) coiling excess guidewire from the fusion splicing and the fusion splice into the storage space.

It is preferable to insert the guidewire from the fusion splicing and the fusion splice into the storage space during manufacture/final assembly of the underwater vehicle so that the vehicle can be permanently sealed during final assembly. The configuration of underwater vehicles can be of a complex nature that means it is not desirable for them to be disassembled after manufacture.

The coiling of the excess guidewire from the fusion splicing and the fusion splice into the storage space may be carried out in the following order:
a) first coiling excess internal guidewire from fusion splicing into the storage space,
b) and then coiling the fusion splice into the storage space,
c) and then coiling excess external guidewire from fusion splicing into the storage space.

The splice cavity may be mounted on the internal dispenser

BRIEF DESCRIPTION OF THE DRAWINGS

For a better understanding of the present invention, reference will now be made, by way of example only, to the accompanying drawings in which:

FIG. 2 is a section through the internal guidewire dispenser and splice cavity of FIG. 1a.

DETAILED DESCRIPTION OF THE PREFERRED EMBODIMENT

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1A:
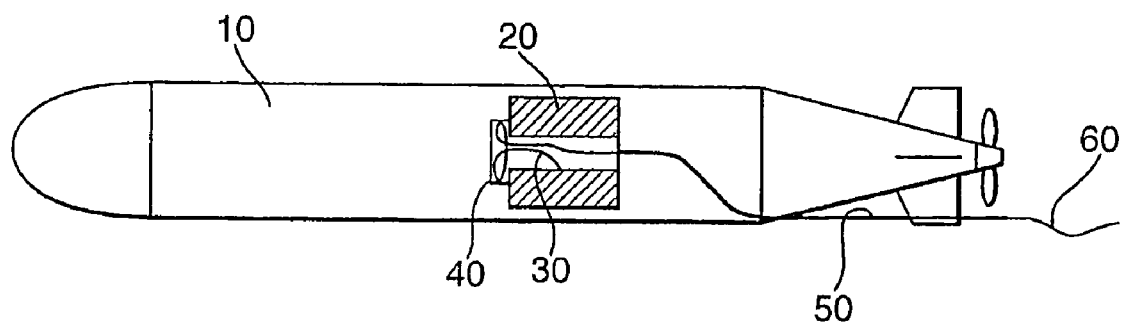
FIG. 1a is a schematic of an assembled underwater weapon in accordance with the invention, with a splice cavity mounted at the fore of an internal guidewire dispenser.
Figure 1B:
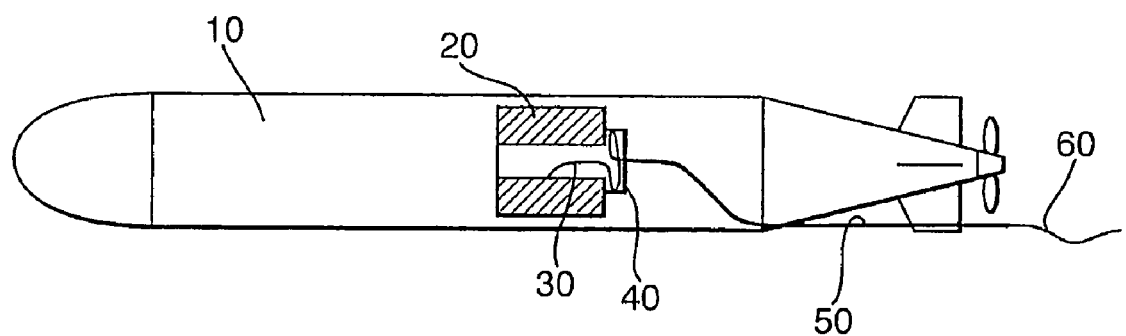
FIG. 1b is a schematic of an assembled underwater weapon in accordance with the invention, with a splice cavity mounted at the aft of an internal guidewire dispenser.
Figure 1C:
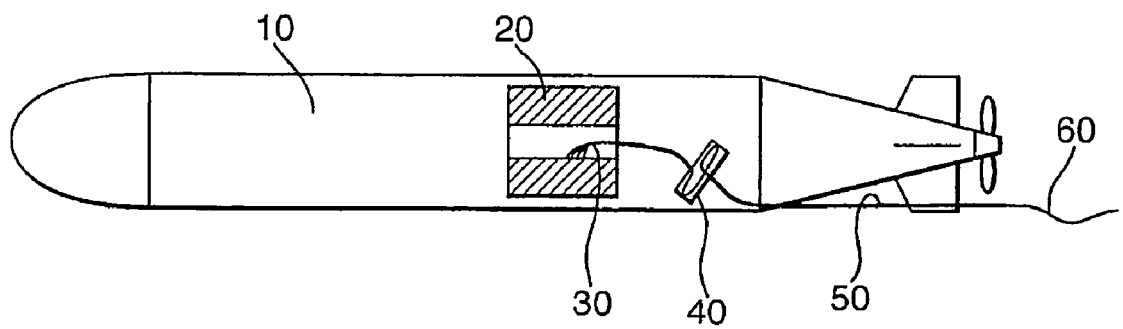
FIG. 1c is a schematic of an assembled underwater weapon in accordance with the invention, with a splice cavity mounted in the body of the underwater vehicle aft of an internal guidewire dispenser.

Referring to figures 1a, b and c, the underwater vehicle 10 comprises an internal guidewire dispenser 20 that has an internal guidewire 30 wound around an internal spool 25 and a splice cavity 40 defining an internal storage space 42. The internal guidewire 30 comprises an optical fibre that is fusion spliced to an external guidewire 60 also comprising an optical fibre to form a splice 50. The external guidewire 60 has been unwound from an external guidewire dispenser (not shown).

FIGS. 1a, b and c show alternative configurations of the underwater vehicle 10 with the splice cavity 40 mounted in different positions. The position the splice cavity 40 is mounted in will be determined by other design criteria, for example weight distribution within the underwater vehicle 10.

Figure 2:
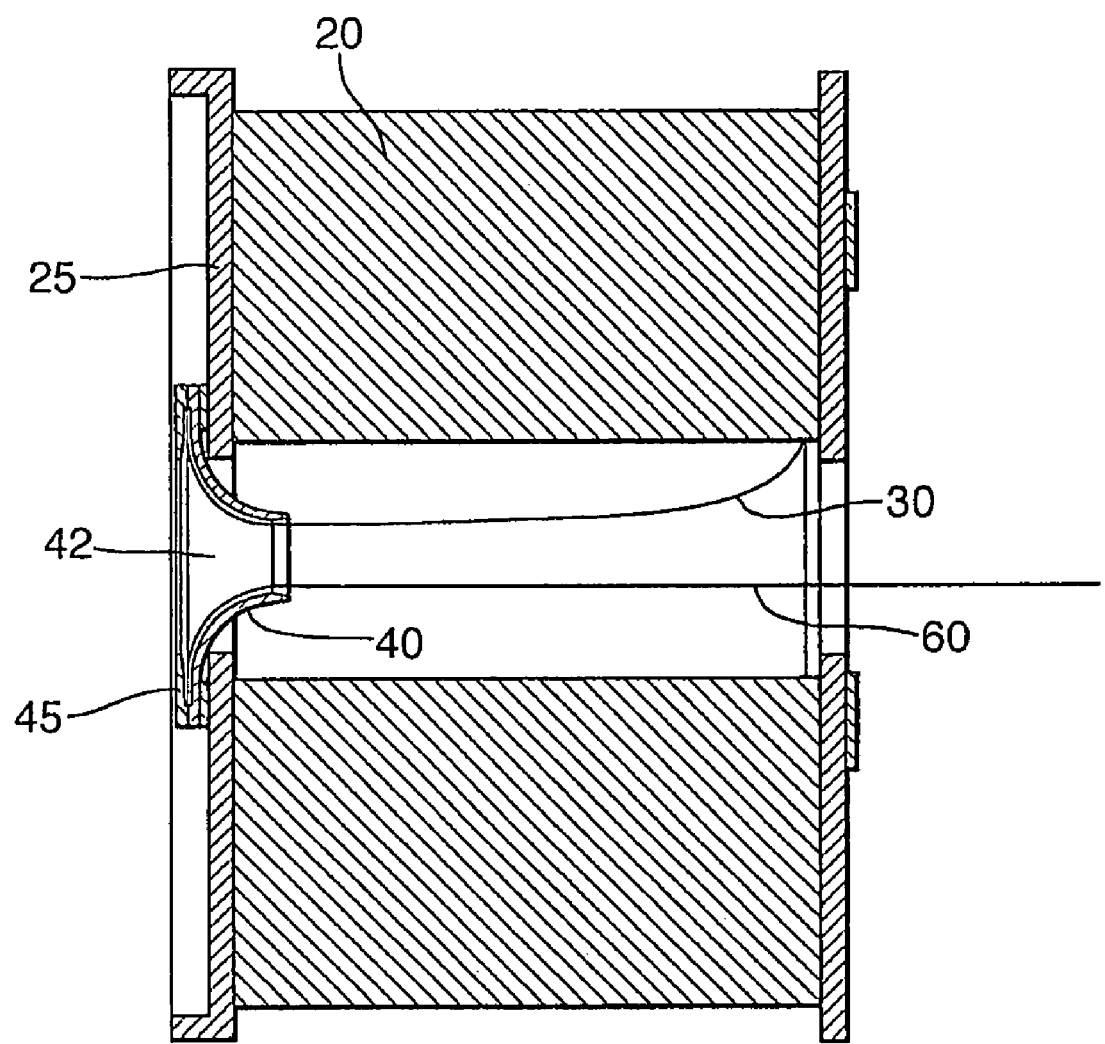

FIG. 2 shows the splice cavity 40 and dispenser configuration of FIG. 1a in more detail.

The fusion splice process requires access to short lengths of unconstrained guidewire from both the internal guidewire dispenser 20 and the external dispenser, resulting in a fusion splice and excess guidewire 45, see FIG. 2, that are not stored in either the internal guidewire dispenser 20 or the external guidewire dispenser when the fusion splice process is completed. The fusion splice and excess guidewire 45 must be accommodated within the vehicle 10. This is achieved by coiling the fusion splice and excess guidewire 45 in the storage space 42, as illustrated in FIG. 2, to allow the fusion splice and excess guidewire 45 to be deployed in a controlled manner Following the fusion splice process, first the excess guidewire from the internal dispenser 20 is progressively coiled and inserted into the periphery of the storage space 42. The fusion splice and then the excess guidewire from the external dispenser are sequentially inserted into the storage space 42. The springiness of the optical fibre causes the coils of excess guidewire and fusion splice to follow and be retained securely within the outer diameter of the storage space 42.

Thus, the splice cavity 40 effectively becomes an additional dispenser to store and deploy the fusion splice and excess guidewire 45 contained therein in a controlled manner. The fusion splice and excess guidewire 45 are contained within the storage space 42 in a 'last in first out' formation. That is, the last length of excess guidewire to be inserted into the storage space 42 becomes the first length of guidewire to be deployed during the launch process.

Once the coils of the fusion splice and excess guidewire 45 stored within the storage space 42 have been deployed, payout continues from (transfers to) the internal spool 25 or external spool.

The splice cavity 40 is shaped like a bellmouth. The storage space 42 has a radius such that, when the fusion splice and excess guidewire 45 are inserted, there is no damage thereof due to bend radius limitations causing the fusion splice and excess guidewire 45 to snap or bend excessively.

Furthermore, the outer diameter of the storage space 42 and the radius of the bellmouth determine the bend radius of the enclosed fusion splice and excess guidewire 45 both during storage and also during subsequent deployment. Thus providing for the controlled release of the fusion splice and excess guidewire 45 during subsequent deployment.

It will be understood that the guidewires could be comprised of microcables or copper wire as alternatives to optical fibres.

During assembly of the underwater vehicle 10 the splice cavity 40 is mounted in the underwater vehicle 10. Sufficient external guidewire 60 is unwound from the external guidewire dispenser to carry out the fusion splice process. The sufficient external guidewire 60 is passed through the centre of the splice cavity 40 and the internal guidewire dispenser 20.

Sufficient internal guidewire 30 is unwound from the internal guidewire dispenser 20 to carry out the fusion splice process. The sufficient internal guidewire 30 is passed through the centre of the splice cavity 40.

Then fusion splicing of the sufficient external guidewire 60 and the sufficient internal guidewire 30 is undertaken.

The resulting fusion splice and excess guidewire 45 are then coiled in the storage space 42. First the excess guidewire from the internal dispenser 20 is progressively coiled and inserted into the periphery of the storage space 42. The fusion splice and then the excess guidewire from the external dispenser are sequentially inserted into the storage space 42.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. An underwater vehicle comprising;
    a housing;
    an internal guidewire dispenser for storing and deploying an internal guidewire; and
    an internal splice cavity, defining a storage space, for carrying a splice between the internal guidewire and an external guidewire and excess guidewire resulting from splicing the internal and external guidewires, said splice cavity being configured to deploy the splice and excess guidewire from the vehicle.

2. The underwater vehicle according to claim 1 wherein the splice cavity is mounted on the internal dispenser.

3. The underwater vehicle according to claim 1 wherein the splice cavity is mounted on the housing.

4. The underwater vehicle according to claim 1 wherein the storage space is shaped to control the bend radius of the splice and the excess guidewire stored therein.

5. The underwater vehicle according to claim 1 wherein the splice cavity provides protection for the splice and the excess guidewire during storage.

6. The underwater vehicle according to claim 1 wherein the excess guidewire from the internal dispenser is coiled around the internal periphery of the storage space.

7. The underwater vehicle according to claim 6 wherein the splice and the excess guidewire from an external dispenser are coiled inside the coils of the excess guidewire from the internal dispenser.

8. The underwater vehicle according to claim 1 wherein the internal and external guidewires comprise optical fibers.

9. The underwater vehicle according to claim 1 wherein the internal and external guidewires comprise microcables.

10. A method of assembling an underwater vehicle having a housing and a wire command link to connect the vehicle to a launch platform, the link including an internal guidewire stored in an internal dispenser and an external guidewire stored in an external dispenser, the method comprising the steps of:
    a) mounting a splice cavity having a storage space in the housing for carrying a splice between the internal guidewire and the external guidewire and excess guidewire resulting from splicing the internal and external guidewires, and for deploying the splice and excess guidewire from the vehicle,
    b) dispensing sufficient external guidewire from the external dispenser to carry out a fusion splice and passing the sufficient external guidewire through the splice cavity and the internal dispenser,
    c) dispensing sufficient internal guidewire from the internal dispenser to carry out a fusion splice and passing the sufficient internal guidewire through the splice cavity,
    d) fusion splicing the sufficient external guidewire and the sufficient internal guidewire, and
    e) coiling excess guidewire from the fusion splicing and the fusion splice into the storage space.

11. The method of assembling an underwater vehicle as claimed in claim 10 wherein coiling the excess guidewire from the fusion splicing into the storage space includes the substeps of:
    e1) first coiling excess internal guidewire from fusion splicing into the storage space,
    e2) and then coiling the fusion splice into the storage space,
    e3) and then coiling excess external guidewire from fusion splicing into the storage space.

12. The method of assembling an underwater vehicle as claimed in claim 10 wherein the splice cavity is mounted on the internal dispenser.

13. The underwater vehicle according the claim 1 wherein the splice cavity is shaped as a bellmouth for dispensing the splice and excess guidewire from the splice cavity during deployment from the vehicle.

14. A method of assembling an underwater vehicle having a housing and a wire command link to connect the vehicle to a launch platform, the link including an internal guidewire stored in an internal dispenser and an external guidewire stored in an external dispenser, the method comprising the steps of:
    a) mounting a splice cavity having a storage space in the housing,
    b) dispensing sufficient external guidewire from the external dispenser to carry out a fusion splice and passing the sufficient external guidewire through the splice cavity and the internal dispenser,
    c) dispensing sufficient internal guidewire from the internal dispenser to carry out a fusion splice and passing the sufficient internal guidewire through the splice cavity,
    d) fusion splicing the sufficient external guidewire and the sufficient internal guidewire, and
    e) coiling excess guidewire from the fusion splicing and the fusion splice into the storage space, said step of coiling including,
    e1) first coiling excess internal guidewire from fusion splicing into the storage space,
    e2) and then coiling the fusion splice into the storage space,
    e3) and then coiling excess external guidewire from fusion splicing into the storage space.

* * * * *